(12) United States Patent
Guizilini et al.

(10) Patent No.: US 11,531,842 B2
(45) Date of Patent: Dec. 20, 2022

(54) INVERTIBLE DEPTH NETWORK FOR IMAGE RECONSTRUCTION AND DOMAIN TRANSFERS

(71) Applicant: TOYOTA RESEARCH INSTITUTE, INC., Los Altos, CA (US)

(72) Inventors: Vitor Guizilini, Santa Clara, CA (US); Adrien David Gaidon, Mountain View, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 351 days.

(21) Appl. No.: 16/879,497

(22) Filed: May 20, 2020

(65) Prior Publication Data

US 2021/0365733 A1    Nov. 25, 2021

(51) Int. Cl.
  *G06K 9/62*   (2022.01)
  *G06N 3/08*   (2006.01)
  *G06V 20/64*  (2022.01)
  *G06V 20/56*  (2022.01)
  *G06V 10/82*  (2022.01)

(52) U.S. Cl.
  CPC ............ *G06K 9/6257* (2013.01); *G06N 3/08* (2013.01); *G06V 10/82* (2022.01); *G06V 20/588* (2022.01); *G06V 20/64* (2022.01)

(58) Field of Classification Search
  None
  See application file for complete search history.

(56) References Cited

U.S. PATENT DOCUMENTS

| 10,346,740 B2 | 7/2019 | Zhang et al. |
| 10,540,590 B2 | 1/2020 | Wang et al. |
| 2020/0258249 A1* | 8/2020 | Angelova ................ G06T 7/20 |

FOREIGN PATENT DOCUMENTS

WO    2012091273 A1    7/2012

OTHER PUBLICATIONS

Lynton Ardizzone, et al., "Analyzing Inverse Problems with Invertible Neural Networks," found at https://arxiv.org/abs/1808.04730, and last revised Feb. 6, 2019.
Gözde Gül Şahin, et al., "Two Birds with One Stone: Investigating Invertible Neural Networks for Inverse Problems in Morphology," found at https://arxiv.org/abs/1912.05274, submitted Dec. 11, 2019.

(Continued)

*Primary Examiner* — Leon Flores
(74) *Attorney, Agent, or Firm* — Seyfarth Shaw LLP

(57) ABSTRACT

A method for image reconstruction and domain transfer through an invertible depth network is described. The method includes training a first invertible depth network model using a first image dataset corresponding to a first geographic region to estimate a first depth map. The method also includes retraining the first invertible depth network model using a second image dataset corresponding to a second geographic region to estimate a second depth map. The method further includes reconstructing, by the first invertible depth network model, a third image dataset based on the second depth map. The method also includes training a second invertible depth network model using the third image dataset corresponding to the first geographic region and the second geographic region to estimate a third depth map.

20 Claims, 6 Drawing Sheets

(56) References Cited

OTHER PUBLICATIONS

Jörn-Henrik Jacobsen, et al., "i-RevNet Deep Invertible Networks," found at https://arxiv.org/abs/1802.07088, submitted Feb. 20, 2018.
Tim J. Adler, et al., "Out of distribution detection for intra-operative functional imaging," Proceedings of the First International Workshop on Uncertainty for Safe Utilization of Machine Learning in Medical Imaging, UNSURE 2019, and the 8th International Workshop on Clinical Image-Based Procedures, CLIP 2019.
Tim J. Adler, et al., "Uncertainty-aware performance assessment optical imaging modalities with invertible neural networks," Int. J. Comput. Assist. Radiol. Surg. (2019).

* cited by examiner

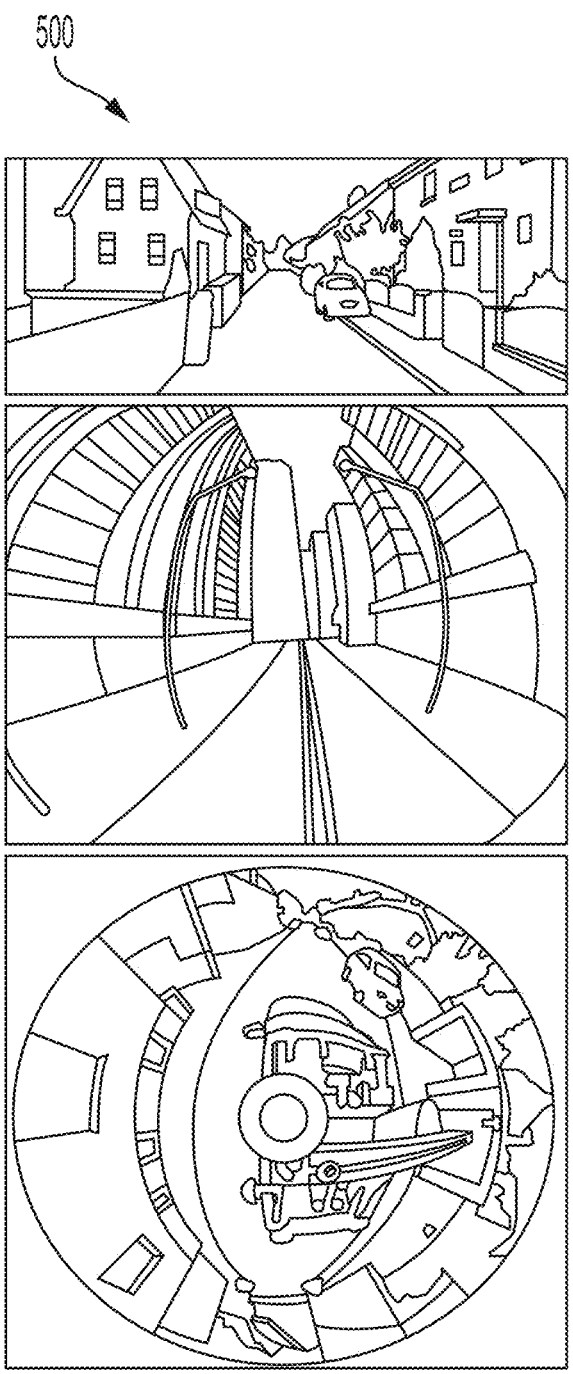 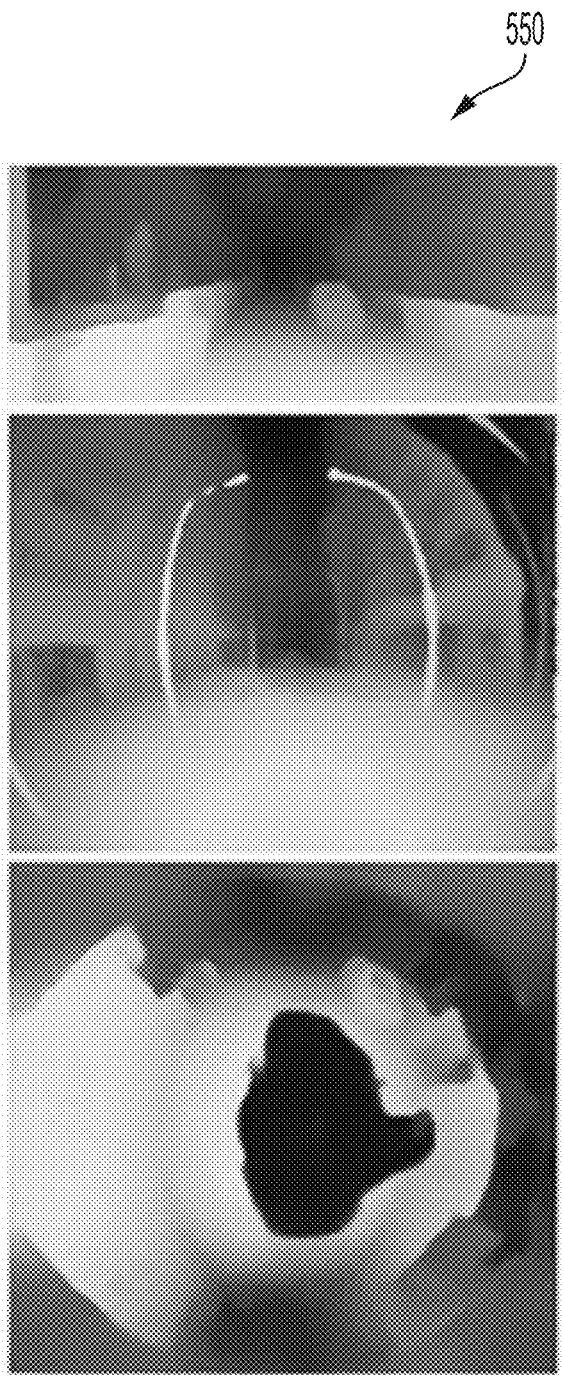
*FIG. 5A*  *FIG. 5B*

INVERTIBLE DEPTH NETWORK FOR IMAGE RECONSTRUCTION AND DOMAIN TRANSFERS

BACKGROUND

Field

Certain aspects of the present disclosure generally relate to machine learning and, more particularly, an invertible depth network for image reconstruction and domain transfer.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision is distinct from the field of digital image processing because of the desire to recover a three-dimensional (3D) structure of the world from images and using the 3D structure for fully understanding a scene. That is, machine vision strives to provide a high-level understanding of a surrounding environment, as performed by the human visual system.

In operation, autonomous agents may rely on a trained convolutional neural network (CNN) to identify objects within areas of interest in a 2D image of a surrounding scene of the autonomous agent. For example, a CNN may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as an autonomous vehicle. Object detection applications for autonomous vehicles, however, are limited to analyzing these 2D sensor images, which omit depth information of our 3D real world.

Depth estimation from 2D images captured by a single camera (e.g., monocular) of an autonomous agent may be referred to as monocular depth estimation. Current monocular depth estimation methods, however, rely on neural networks that learn to compress the information in useful ways in order to improve for the task at hand (e.g., depth estimation). Unfortunately, conventional depth estimation using a neural network relies on lossy compression that prevents recovery of the original input.

SUMMARY

A method for image reconstruction and domain transfer through an invertible depth network is described. The method includes training a first invertible depth network model using a first image dataset corresponding to a first geographic region to estimate a first depth map. The method also includes retraining the first invertible depth network model using a second image dataset corresponding to a second geographic region to estimate a second depth map. The method further includes reconstructing, by the first invertible depth network model, a third image dataset based on the second depth map. The method also includes training a second invertible depth network model using the third image dataset corresponding to the first geographic region and the second geographic region to estimate a third depth map.

A non-transitory computer-readable medium having program code recorded thereon for image reconstruction and domain transfer through an invertible depth network is described. The non-transitory computer-readable medium includes program code executed by a processor. The non-transitory computer-readable medium includes program code to train a first invertible depth network model using a first image dataset corresponding to a first geographic region to estimate a first depth map. The non-transitory computer-readable medium also includes program code to retrain the first invertible depth network model using a second image dataset corresponding to a second geographic region to estimate a second depth map. The non-transitory computer-readable medium further includes program code to reconstruct, by the first invertible depth network model, a third image dataset based on the second depth map. The non-transitory computer-readable medium also includes program code to train a second invertible depth network model using the third image dataset corresponding to the first geographic region and the second geographic region to estimate a third depth map.

A system for image reconstruction and domain transfer through an invertible depth network is described. The system includes a depth map estimation module to train a first invertible depth network model using a first image dataset corresponding to a first geographic region to estimate a first depth map. The depth estimation module is also configured to retrain the first invertible depth network model using a second image dataset corresponding to a second geographic region to estimate a second depth map. The system also includes an image reconstruction module to reconstruct, using the first invertible depth network model, a third image dataset based on the second depth map. The system further includes a domain transfer module to train a second invertible depth network model using the third image dataset corresponding to the first geographic region and the second geographic region to estimate a third depth map.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 5A-5B show drawings illustrating self-supervised monocular depth and pose estimation for an array of cameras, according to aspects of the present disclosure.

DETAILED DESCRIPTION

Figure 1:
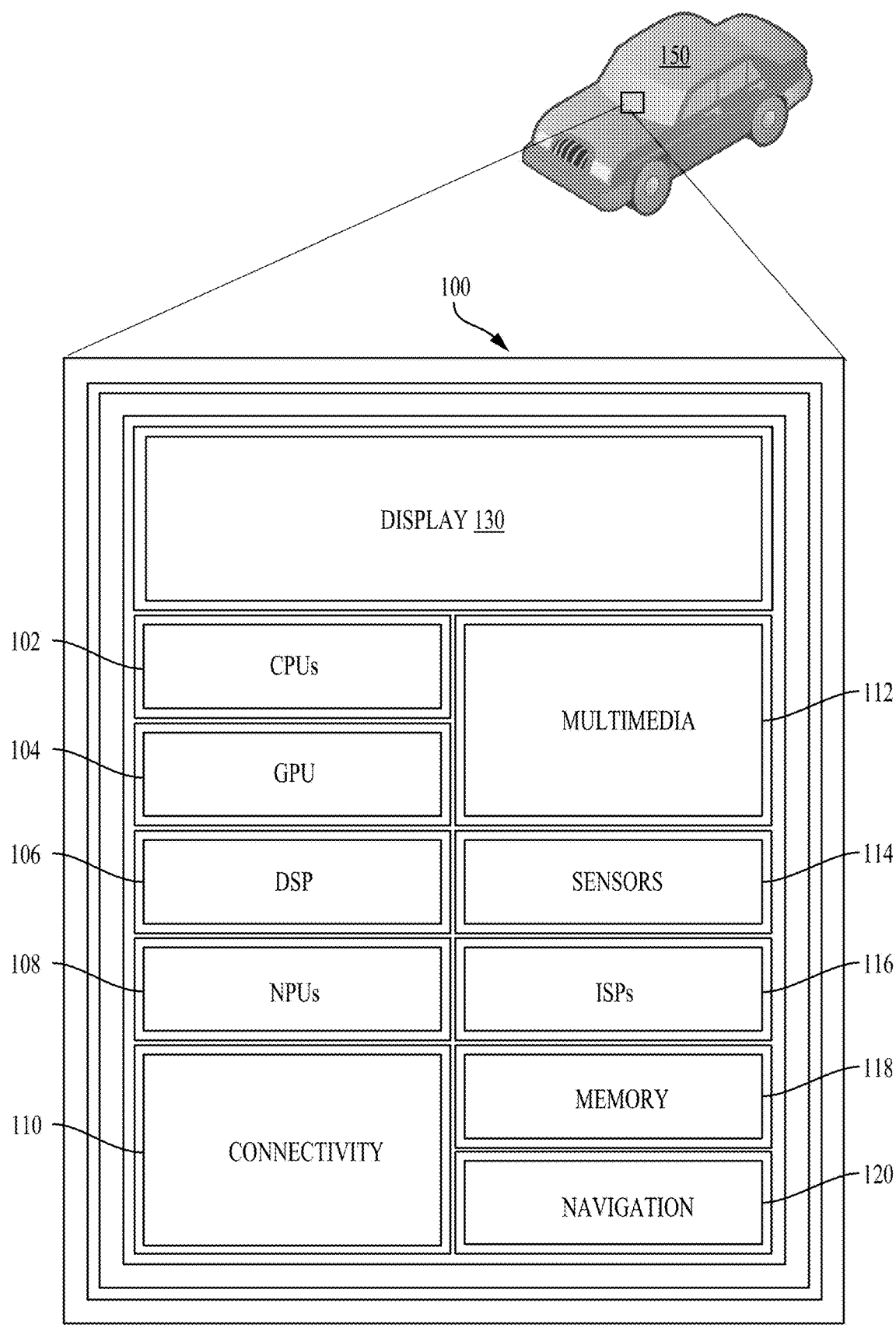
FIG. 1 illustrates an example implementation of designing a system using a system-on-a-chip (SOC) for an invertible depth network, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than, the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Depth map estimation is an important perception task in the area of autonomous agents, such as driverless cars and robots, which are quickly evolving and have become a reality in this decade. Depth map estimation from 2D images captured by a single camera (e.g., monocular) of an autonomous agent may be referred to as monocular depth estimation. Depth estimation from 2D images captured by a single camera (e.g., monocular) of an autonomous agent may be referred to as monocular depth estimation. Current monocular depth estimation methods, however, rely on neural networks that learn to compress information in useful ways in order to improve for the task at hand (e.g., depth estimation). Unfortunately, conventional depth estimation using a neural network relies on lossy compression that prevents recovery of the original input.

In contrast to convolutional neural networks, invertible neural networks preserve information between layers, which enables full reconstruction of an input when given an output. The present disclosure is directed to configuring an invertible neural network for implementing an invertible depth network for performing depth estimation. The invertible depth network achieves results competitive to the state-of-the-art systems, with the added benefit of being able to recover input red-green-blue (RGB) images from depth maps.

Recovering input RGB images from depth maps is particularly useful for domain transfer, with the added benefit of being able to recover input RGB images from depth maps. According to aspects of the present disclosure, an invertible depth network is configured to provide a forward path to estimate a depth map that captures a depth distance for each pixel of an RGB image relative to a captured structure in the RGB image. In one configuration, the invertible depth network preserves information between layers to provide a backward path in the invertible depth network. In one configuration of the invertible depth network, the backward path enables reconstruction of an RGB image from a depth map estimated by the forward path of the invertible depth network. In this configuration, the same layers of the invertible depth network are traversed both to produce the depth map and reproduce the RGB image.

Aspects of the present disclosure enable training of invertible depth networks using much larger datasets. According to aspects of the present disclosure, an invertible depth network is configured to perform domain transfer. According to this aspect of the present disclosure, one model trained on one dataset (A) is used to reconstruct an input RGB image corresponding to a depth map produced by a model trained on another dataset (B). Alternatively, the input RGB image is reconstructed based on a ground-truth depth image used to train the model based on a synthetic dataset. As a result, the reconstructed RGB image may have a different style than the original dataset (B), that is much closer to the dataset (A). This artificially increases the number of images available for the dataset (A). This is possible because depth has a much smaller domain gap between datasets because geometric structures are invariant to several properties (illumination, texture, etc.).

FIG. 1 illustrates an example implementation of the aforementioned system and method for an invertible depth network, using a system-on-a-chip (SOC) 100 of an ego vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fourth generation long term evolution (4G LTE) connectivity, unlicensed Wi-Fi connectivity, USB connectivity, Bluetooth® connectivity, and the like. In addition, a multimedia processor 112 in combination with a display 130 may, for example, classify and categorize poses of objects in an area of interest, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the ego vehicle 150. In this arrangement, the ego vehicle 150 may include a processor and other features of the SOC 100. In this aspect of the present disclosure, instructions loaded into a processor (e.g., CPU 102) or the NPU 108 of the ego vehicle 150 may include code for an invertible depth network from an image captured by the sensor processor 114. The instructions loaded into a processor (e.g., CPU 102) may also include code for planning and control (e.g., intention prediction of the ego vehicle) in response to detecting ego-motion of the ego vehicle based on an image captured by the sensor processor 114.

Figure 2:
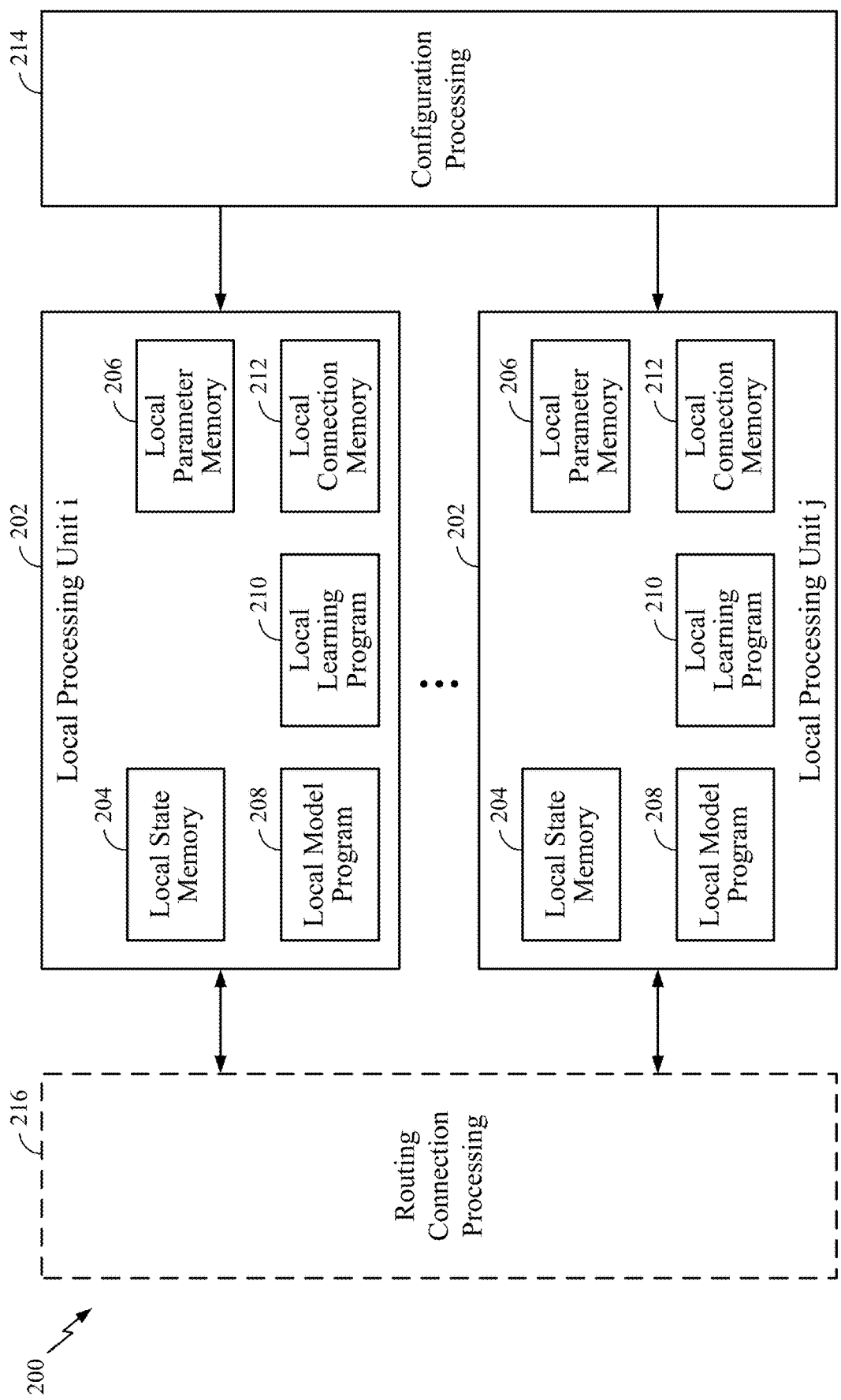
FIG. 2 illustrates an example implementation of an invertible depth network system, in accordance with aspects of the present disclosure.

FIG. 2 illustrates an example implementation of an invertible depth network system 200 in accordance with aspects of the present disclosure. As illustrated in FIG. 2, the invertible depth network system 200 may have local processing units 202 that may perform various operations of methods for image reconstruction and domain transfer using an invertible depth network. Each of the local processing units 202 may include a local state memory 204 and a local parameter memory 206 that may store parameters of an invertible depth network. The invertible depth network system 200 is configured to implement an invertible neural network for performing depth estimation to achieve results competitive to the state-of-the-art systems, with the added benefit of being able to recover RGB images from depth maps.

In addition, each of the local processing units 202 may have a local (neuron) model program (LMP) memory 208 for storing a local model program, a local learning program (LLP) memory 210 for storing a local learning program, and a local connection memory 212. Furthermore, as illustrated in FIG. 2, each of the local processing units 202 may interface with a configuration processing unit 214 for providing configurations for local memories of the local processing unit, and with a routing connection processing unit 216 that provides routing between the local processing units 202.

Deep learning architectures may perform a depth estimation task by learning to represent inputs at successively higher levels of abstraction in each layer, thereby building up a useful feature representation of an input data. In this way, deep learning may address a major bottleneck of traditional machine learning. In particular, deep learning architectures may learn to estimate depth through training. Furthermore, a deep learning network (e.g., a convolutional neural network (CNN)) may learn to represent and recognize different types of depth that a human may not have considered.

A convolutional neural network (CNN) may be trained with supervised learning. During training, a CNN may be presented with a ground-truth depth image, and/or depth map datasets. The network designer may want the CNN to output an estimate of a depth with a high degree of confidence. Before training, the output produced by the CNN is likely to be incorrect, and so an error may be calculated between the actual output and the target output. The weights of the CNN may then be adjusted so that the output scores of the CNN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce error. This manner of adjusting the weights may be referred to as "back propagation" as it involves a "backward pass" through the neural network.

In operation, a convolutional neural network compresses information in a manner that improves the task at hand, such as depth estimation and/or a depth map generation. That is, convolutional networks do not preserve information between layers. As a result, a convolutional network cannot enable the full reconstruction of an input when given an output. This is not possible in standard conventional neural networks, that learn to compress the information in useful ways in order to improve for preforming the task at hand. Unfortunately, compressing the information comes with the price of lossy compression, which makes recovery of the original input impossible.

As shown in FIG. 2 the invertible depth network system 200 is implemented by configuring each of the local processing units 202, the local state memory 204, and the local parameter memory 206 to store parameters of an invertible depth network. In contrast to convolutional neural networks, invertible neural networks preserve information between layers, which enables full reconstruction of an input when given an output. The present disclosure is directed to configuring an invertible neural network for implementing the invertible depth network system 200 for performing depth estimation. The invertible depth network system 200 achieves results competitive to the state-of-the-art systems, with the added benefit of being able to recover input RGB images from depth maps.

According to aspects of the present disclosure, the invertible depth network system 200 is configured to perform domain transfer. Recovering input RGB images from depth maps is particularly useful for domain transfer. According to this aspect of the present disclosure, one model trained on one dataset (A) is used to reconstruct an input RGB image corresponding to a depth map produced by a model trained on another dataset (B). Alternatively, the input RGB image is reconstructed based on a ground-truth depth image used to train the model based on a synthetic dataset. As a result, the reconstructed RGB image may have a different style than the original dataset (B), that is much closer to the dataset (A). This artificially increases the number of images available for the dataset. (A).

Figure 3:
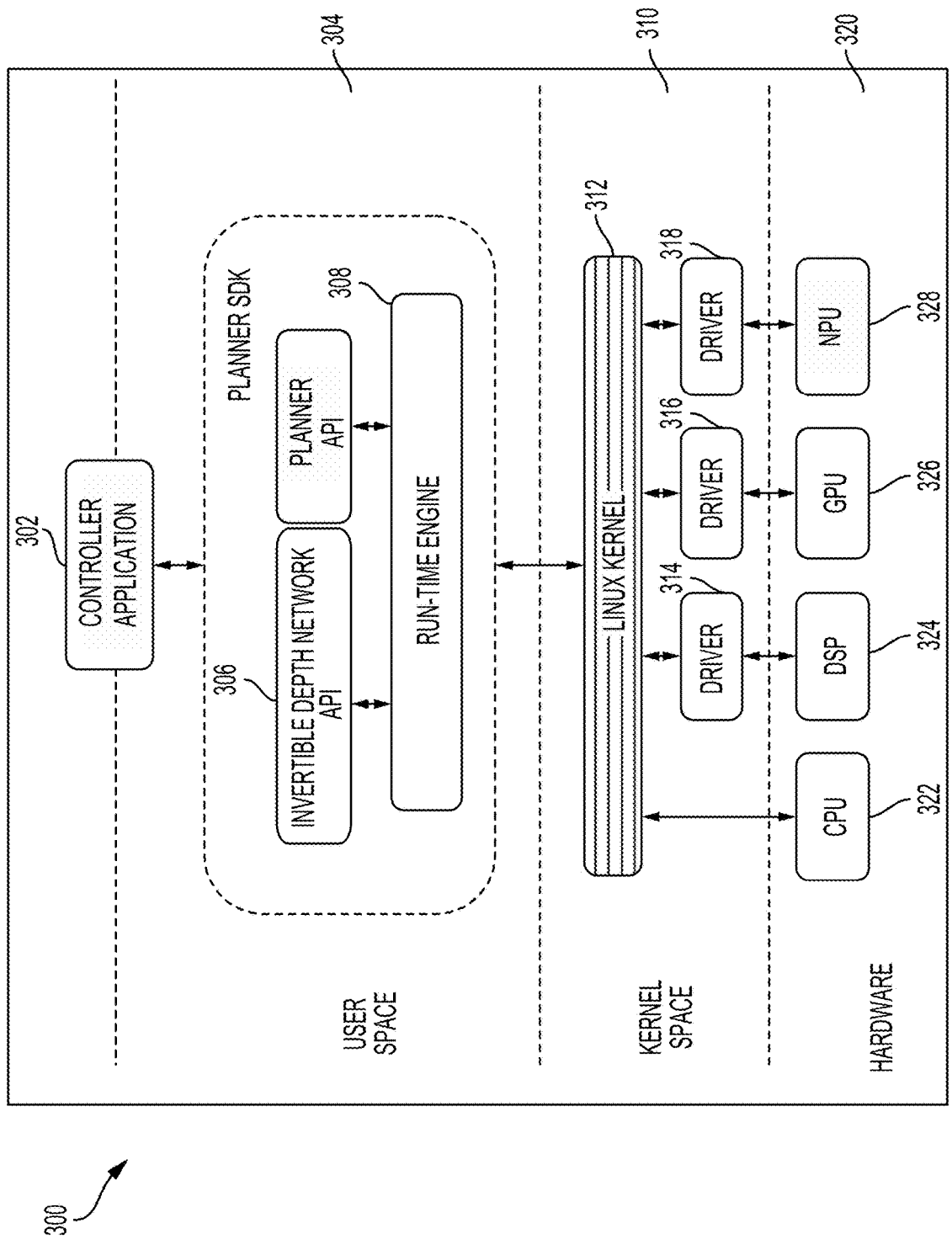
FIG. 3 is a block diagram illustrating a software architecture that may modularize functions for an invertible depth network, according to aspects of the present disclosure.

FIG. 3 is a block diagram illustrating a software architecture 300 that may modularize functions for planning and control of an ego vehicle for an invertible depth network, according to aspects of the present disclosure. Using the architecture, a controller application 302 may be designed such that it may cause various processing blocks of an SOC 320 (for example a CPU 322, a DSP 324, a GPU 326, and/or an NPU 328) to perform supporting computations during run-time operation of the controller application 302.

The controller application 302 may be configured to call functions defined in a user space 304 that may, for example, provide depth estimation using an invertible neural network of an ego vehicle. The controller application 302 may make a request to compile program code associated with a library defined in an invertible depth network application programming interface (API) 306 for depth-aware learning from an invertible depth network of an autonomous agent.

A run-time engine 308, which may be compiled code of a runtime framework, may be further accessible to the controller application 302. The controller application 302 may cause the run-time engine 308, for example, to perform monocular (single-camera) 3D detection. When an object is detected within a predetermined distance of the ego vehicle, the run-time engine 308 may in turn send a signal to an operating system 310, such as a Linux Kernel 312, running on the SOC 320. The operating system 310, in turn, may cause a computation to be performed on the CPU 322, the DSP 324, the GPU 326, the NPU 328, or some combination thereof. The CPU 322 may be accessed directly by the operating system 310, and other processing blocks may be accessed through a driver, such as drivers 314-318 for the DSP 324, for the GPU 326, or for the NPU 328. In the illustrated example, the deep neural network may be configured to run on a combination of processing blocks, such as the CPU 322 and the GPU 326, or may be run on the NPU 328, if present.

Figure 4:
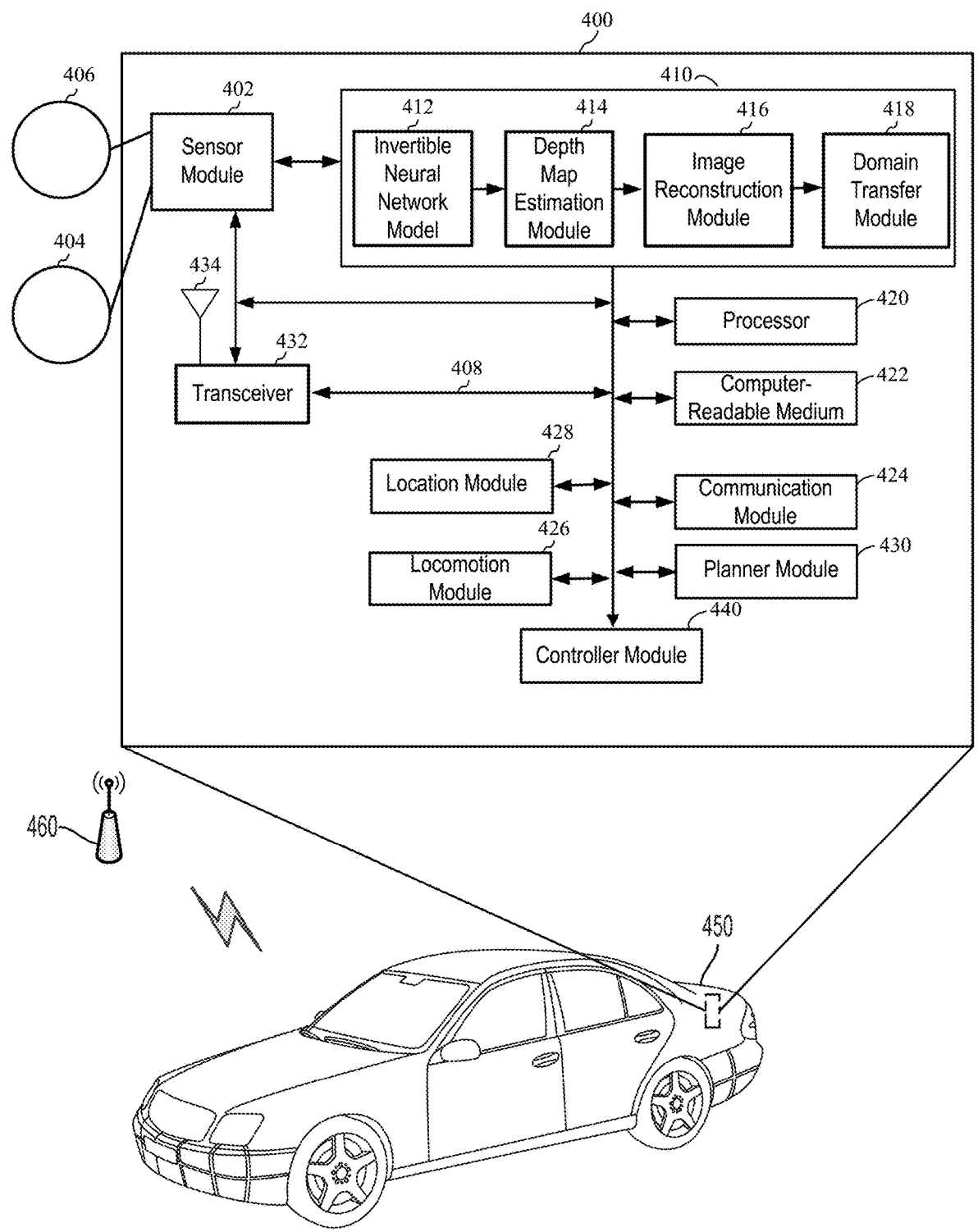
FIG. 4 is a diagram illustrating an example of a hardware implementation for an invertible depth system, according to aspects of the present disclosure.

FIG. 4 is a diagram illustrating an example of a hardware implementation for an invertible depth system 400, according to aspects of the present disclosure. The invertible depth system 400 may be configured for planning and control of an ego vehicle in response to monocular (single-camera) depth estimation during training of a car 450. The invertible depth system 400 may be a component of a vehicle, a robotic device, or other device. For example, as shown in FIG. 4, the invertible depth system 400 is a component of the car 450. Aspects of the present disclosure are not limited to the invertible depth system 400 being a component of the car 450, as other devices, such as a bus, motorcycle, or other like vehicle, are also contemplated for using the invertible depth system 400. The car 450 may be autonomous or semi-autonomous.

The invertible depth system 400 may be implemented with an interconnected architecture, represented generally by an interconnect 408. The interconnect 408 may include any number of point-to-point interconnects, buses, and/or bridges depending on the specific application of the invertible depth system 400 and the overall design constraints of the car 450. The interconnect 408 links together various circuits including one or more processors and/or hardware modules, represented by a sensor module 402, an ego perception module 410, a processor 420, a computer-readable medium 422, communication module 424, a locomotion module 426, a location module 428, a planner module 430, and a controller module 440. The interconnect 408 may also link various other circuits such as timing sources, peripherals, voltage regulators, and power management circuits, which are well known in the art and, therefore, will not be described any further.

The invertible depth system 400 includes a transceiver 432 coupled to the sensor module 402, the ego perception module 410, the processor 420, the computer-readable medium 422, the communication module 424, the locomotion module 426, the location module 428, a planner module 430, and the controller module 440. The transceiver 432 is coupled to an antenna 434. The transceiver 432 communicates with various other devices over a transmission medium. For example, the transceiver 432 may receive commands via transmissions from a user or a remote device. As discussed herein, the user may be in a location that is remote from the location of the car 450. As another example, the transceiver 432 may transmit planned actions from the ego perception module 410 to a server (not shown).

The invertible depth system 400 includes the processor 420 coupled to the computer-readable medium 422. The processor 420 performs processing, including the execution of software stored on the computer-readable medium 422 to provide functionality, according to the present disclosure. The software, when executed by the processor 420, causes the invertible depth system 400 to perform the various functions described for ego vehicle perception based on invertible depth estimation from video captured by an invertible depth network of an ego vehicle, such as the car 450, or any of the modules (e.g., 402, 410, 424, 426, 428, 430, and/or 440). The computer-readable medium 422 may also be used for storing data that is manipulated by the processor 420 when executing the software.

The sensor module 402 may obtain images via different sensors, such as a first sensor 404 and a second sensor 406. The first sensor 404 may be a vision sensor (e.g., a stereoscopic camera or a red-green-blue (RGB) camera) for capturing 2D RGB images. The second sensor 406 may be a ranging sensor, such as a light detection and ranging (LIDAR) sensor or a radio detection and ranging (RADAR) sensor. Of course, aspects of the present disclosure are not limited to the aforementioned sensors, as other types of sensors (e.g., thermal, sonar, and/or lasers) are also contemplated for either of the first sensor 404 or the second sensor 406.

The images of the first sensor 404 and/or the second sensor 406 may be processed by the processor 420, the sensor module 402, the ego perception module 410, the communication module 424, the locomotion module 426, the location module 428, and the controller module 440. In conjunction with the computer-readable medium 422, the images from the first sensor 404 and/or the second sensor 406 are processed to implement the functionality described herein. In one configuration, detected 3D object information captured by the first sensor 404 and/or the second sensor 406 may be transmitted via the transceiver 432. The first sensor 404 and the second sensor 406 may be coupled to the car 450 or may be in communication with the car 450.

The location module 428 may determine a location of the car 450. For example, the location module 428 may use a global positioning system (GPS) to determine the location of the car 450. The location module 428 may implement a dedicated short-range communication (DSRC)-compliant GPS unit. A DSRC-compliant GPS unit includes hardware and software to make the car 450 and/or the location module 428 compliant with one or more of the following DSRC standards, including any derivative or fork thereof: EN 12253:2004 Dedicated Short-Range Communication—

Physical layer using microwave at 5.9 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 428 is operable to provide GPS data describing the location of the car 450 with space-level accuracy for accurately directing the car 450 to a desired location. For example, the car 450 is driving to a predetermined location and desires partial sensor data. Space-level accuracy means the location of the car 450 is described by the GPS data sufficient to confirm a location of the car 450 parking space. That is, the location of the car 450 is accurately determined with space-level accuracy based on the GPS data from the car 450.

The communication module 424 may facilitate communications via the transceiver 432. For example, the communication module 424 may be configured to provide communication capabilities via different wireless protocols, such as Wi-Fi, long term evolution (LTE), 3G, etc. The communication module 424 may also communicate with other components of the car 450 that are not modules of the invertible depth system 400. The transceiver 432 may be a communications channel through a network access point 460. The communications channel may include DSRC, LTE, LTE-D2D, mmWave, Wi-Fi (infrastructure mode), Wi-Fi (ad-hoc mode), visible light communication, TV white space communication, satellite communication, full-duplex wireless communications, or any other wireless communications protocol such as those mentioned herein.

In some configurations, the network access point 460 includes Bluetooth® communication networks or a cellular communications network for sending and receiving data, including via short messaging service (SMS), multimedia messaging service (MMS), hypertext transfer protocol (HTTP), direct data connection, wireless application protocol (WAP), e-mail, DSRC, full-duplex wireless communications, mmWave, Wi-Fi (infrastructure mode), Wi-Fi (ad-hoc mode), visible light communication, TV white space communication, and satellite communication. The network access point 460 may also include a mobile data network that may include 3G, 4G, 5G, LTE, LTE-V2X, LTE-D2D, VoLTE, or any other mobile data network or combination of mobile data networks. Further, the network access point 460 may include one or more IEEE 802.11 wireless networks.

The invertible depth system 400 also includes the planner module 430 for planning a selected route/action (e.g., collision avoidance) of the car 450 and the controller module 440 to control the locomotion of the car 450. The controller module 440 may perform the selected action via the locomotion module 426 for autonomous operation of the car 450 along, for example, a selected route. In one configuration, the planner module 430 and the controller module 440 may collectively override a user input when the user input is expected (e.g., predicted) to cause a collision according to an autonomous level of the car 450. The modules may be software modules running in the processor 420, resident/stored in the computer-readable medium 422, and/or hardware modules coupled to the processor 420, or some combination thereof.

The National Highway Traffic Safety Administration (NHTSA) has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control (ACC); parking assistance with automated steering; and lane keeping assistance (LKA) type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle (HAV) is an autonomous vehicle that is Level 3 or higher. Accordingly, in some configurations the car 450 is one of the following: a Level 0 non-autonomous vehicle; a Level 1 autonomous vehicle; a Level 2 autonomous vehicle; a Level 3 autonomous vehicle; a Level 4 autonomous vehicle; a Level 5 autonomous vehicle; or an HAV.

The ego perception module 410 may be in communication with the sensor module 402, the processor 420, the computer-readable medium 422, the communication module 424, the locomotion module 426, the location module 428, the planner module 430, the transceiver 432, and the controller module 440. In one configuration, the ego perception module 410 receives sensor data from the sensor module 402. The sensor module 402 may receive the sensor data from the first sensor 404 and the second sensor 406. According to aspects of the present disclosure, the ego perception module 410 may receive sensor data directly from the first sensor 404 or the second sensor 406 to perform depth estimation from images captured by the first sensor 404 or the second sensor 406 of the car 450, based on training using an invertible depth network.

In robotics and 3D computer vision, a depth model that relates image pixels and 3D world points is a prerequisite for many tasks, including visual odometry and 3D object detection. Training of these depth models is dependent on a substantial amount of training data. In addition, recovering input RGB images from estimated depth maps is not possible using convolutional neural networks. In particular, depth map estimation is an important perception task in the area of autonomous agents, such as driverless cars and robots, which are quickly evolving and have become a reality in this decade.

Depth estimation from 2D images captured by a single camera (e.g., monocular) of an autonomous agent may be referred to as monocular depth estimation. Current depth estimation methods, however, rely on neural networks that learn to compress information in useful ways in order to improve for performing the task at hand (e.g., depth estimation). Unfortunately, conventional depth estimation using a neural network relies on lossy compression that prevents recovery of the original input.

In contrast to convolutional neural networks, invertible neural networks preserve information between layers, which enables full reconstruction of an input when given an output. The present disclosure is directed to configuring an invertible neural network for implementing an invertible depth network for performing depth estimation. The invertible depth network achieves results competitive with the state-of-the-art systems, with the added benefit of being able to recover input RGB images from depth maps by preserving information between layers.

Recovering input RGB images from depth maps is particularly useful for domain transfer, with the added benefit of being able to recover input RGB images from depth maps. According to aspects of the present disclosure, an invertible depth network is configured to provide a forward path to estimate a depth map that captures a depth distance for each pixel of an RGB image relative to a captured structure in the RGB image. In one configuration, the invertible depth network preserves information between layers to provide a backward path in the invertible depth network. In one configuration of the invertible depth network, the backward path enables reconstruction of an RGB image from a depth map estimated by the forward path of the invertible depth network. In this configuration, the same layers of the invertible depth network are traversed both to produce the depth map and reproduce the RGB image.

According to aspects of the present disclosure, the invertible depth system 400 is configured to perform domain transfer, which enable training of invertible depth networks using much larger datasets. According to this aspect of the present disclosure, one model trained on one dataset (A) is used to reconstruct an input RGB image corresponding to a depth map produced by a model trained on another dataset (B). Alternatively, the input RGB image is reconstructed based on a ground-truth depth image used to train the model based on a synthetic dataset. As a result, the reconstructed RGB image may have a different style than the original dataset (B) that is much closer to the dataset (A). This artificially increases the number of images available for the dataset (A).

As shown in FIG. 4, the ego perception module 410 includes an invertible neural network model 412, a depth map estimation module 414, an image reconstruction module 416, and a domain transfer module 418. The invertible neural network model 412, the depth map estimation module 414, the image reconstruction module 416, and the domain transfer module 418 may be components of a same or different artificial neural network, such as an invertible neural network. The ego perception module 410 is based on the invertible neural network model 412, which is configured to preserve information between layers, which enables full reconstruction of an input when given an output using the image reconstruction module 416.

The ego perception module 410 receives a data stream from the first sensor 404 and/or the second sensor 406. The data stream may include a 2D RGB image from the first sensor 404 and LIDAR data points from the second sensor 406. The data stream may include multiple frames, such as image frames. In this configuration, the first sensor 404 captures monocular (single camera) 2D RGB images. The domain transfer module 418 enables training of the depth map estimation module 414 and the invertible neural network model 412 with a much larger dataset based on reconstructed RGB image from multiple datasets.

The ego perception module 410 is configured to perform depth map estimation for autonomous operation of the car 450. According to aspects of the present disclosure, the domain transfer module 418 enables use of a first model trained on a first dataset (A) to reconstruct an input RGB image corresponding to a depth map produced by a model trained on a second dataset (B). The input RGB image is also reconstructed based on a ground-truth depth image used to train the invertible neural network model based on a synthetic dataset. As a result, the reconstructed RGB image may have a different style than the original, second dataset (B) that is much closer to the first dataset (A). This artificially increases the number of images available for the dataset (A). This is possible because depth has a much smaller domain gap between datasets because geometric structures are invariant to several properties (illumination, texture, etc.).

FIGS. 5A-5B show drawings illustrating depth map estimation using an invertible depth network, according to aspects of the present disclosure. FIG. 5A illustrates an input of a monocular video scene 500 captured with a pinhole camera (first row), a fisheye camera (second row), and a catadioptric camera (third row).

FIG. 5B illustrates a depth map 550 of the monocular video scene 500 of FIG. 5A captured with the pinhole camera (first row), the fisheye camera (second row), and the catadioptric camera (third row). According to aspects of the present disclosure, the invertible neural network model 412 of FIG. 4 is configured to provide a forward path to estimate the depth map 550, which captures a depth distance for each pixel of the monocular video scene 500 relative to a captured structure. In one configuration, the invertible neural network model 412 preserves information between layers to provide a backward path within the invertible neural network model 412.

In one configuration of the invertible neural network model 412, the backward path enables the image reconstruction module 416 to reconstruct the monocular video scene 500 from the depth map 550 estimated by the forward path of the invertible neural network model 412 by the depth map estimation module 414. In this configuration, the same layers of the invertible neural network model 412 are traversed both to produce the depth map 550 and reproduce the RGB image. Recovering input RGB images from depth maps is particularly useful for domain transfer. According to aspects of the present disclosure, the ego perception module 410 is configured to perform domain transfer using the domain transfer module 418 to perform a process as further described in FIG. 6.

Figure 6:
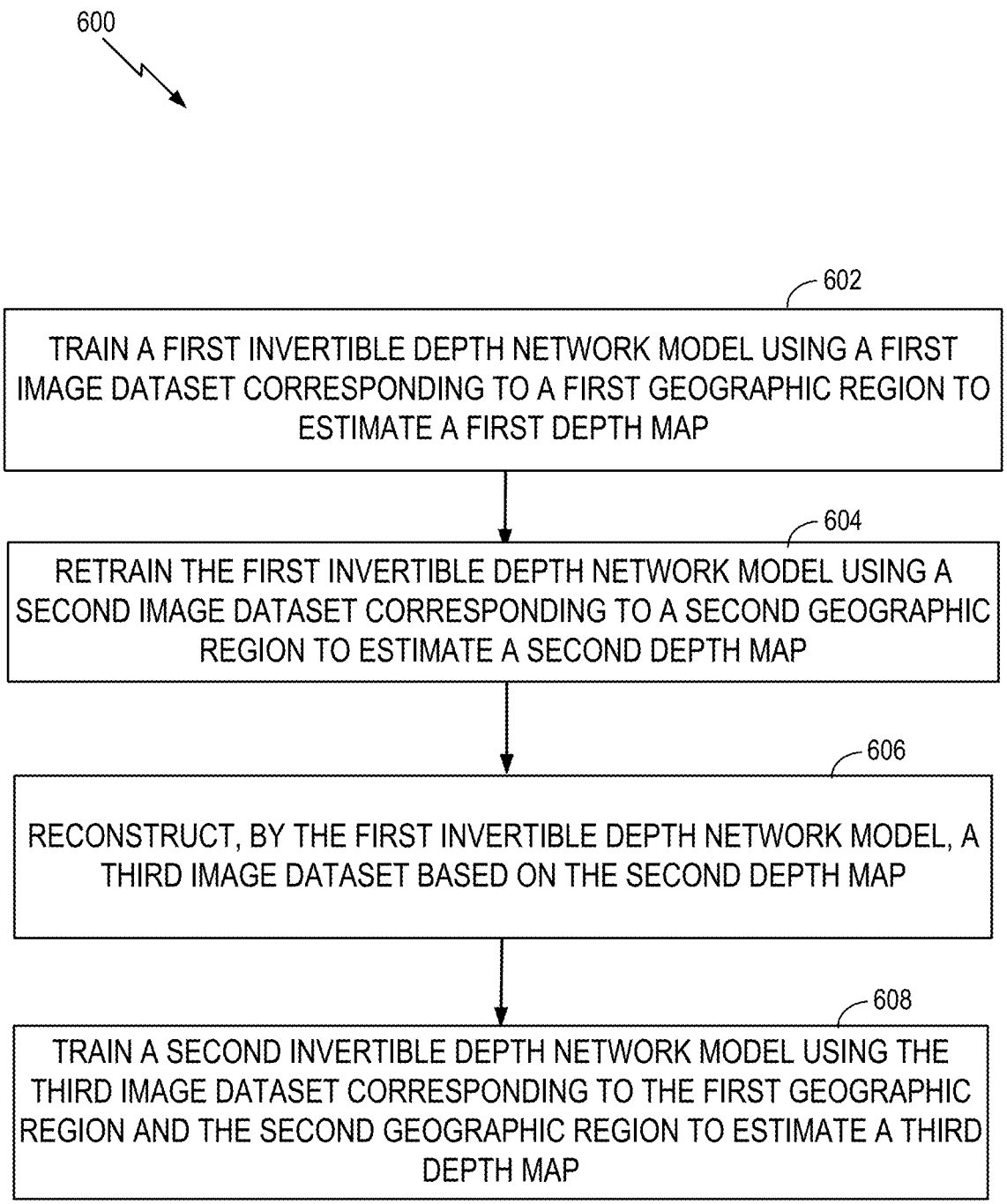
FIG. 6 is a flowchart illustrating a method for image reconstruction and domain transfer through an invertible depth network, according to aspects of the present disclosure.

FIG. 6 is a flowchart illustrating a method for image reconstruction and domain transfer through an invertible depth network, according to aspects of the present disclosure. The method 600 begins at block 602, in which a first invertible depth network model is trained using a first image dataset corresponding to a first geographic region to estimate a first depth map. The first geographic region may be a first city within a first state of a first country, and the second geographic region may be a second city within a second state of a second country. For example, as shown in FIG. 4, the invertible neural network model 412 is trained using a first image dataset based on the San Francisco bay area region of California in the United States. At block 604, the first invertible depth network model is retrained using a second image dataset corresponding to a second geographic region to estimate a second depth map. For example, as shown in FIG. 4, the invertible neural network model 412 is retrained using a second image dataset based on the Tokyo region of Japan.

At block 606, the first invertible depth network model reconstructs a third image dataset based on the second depth map. For example, as shown in FIG. 4, the image reconstruction module 416 traverses a backward path of the invertible neural network model 412 to reconstruct the third image dataset. For example, a first model trained on a first dataset (A) is used to reconstruct an input RGB image corresponding to a second depth map produced by a second model trained on a second dataset (B). The reconstructed RGB image may have a different style than the second dataset (B) that is much closer to the first dataset (A).

At block 608, a second invertible depth network model is trained using the third image dataset corresponding to the first geographic region and the second geographic region to estimate a third depth map. For example, as shown in FIG. 4, the domain transfer module 418 artificially increases the number of images available for the third dataset, which is based on the first geographic region and the second geographic region. The method 600 may also include estimating a trajectory of an ego vehicle based on the estimated depth.

For example, as shown in FIG. 4, the ego perception module 410 estimates ego motion of the car 450. The method 600 also includes planning a trajectory of an ego vehicle according to the estimated trajectory of the ego vehicle, for example, as performed by the planner module 430 and/or the controller module 440 shown in FIG. 4. Ego vehicle perception using invertible depth system 400 for depth map estimation from a single camera of the car 450 is beneficially improved according to aspects of the present disclosure.

In some aspects of the present disclosure, the method 600 may be performed by the SOC 100 (FIG. 1) or the software architecture of the invertible depth network system 200 (FIG. 2) of the ego vehicle 150 (FIG. 1). That is, each of the elements of method 600 may, for example, but without limitation, be performed by the SOC 100, the invertible depth network system 200, or the processor (e.g., CPU 102) and/or other components included therein of the ego vehicle 150.

The various operations of methods described above may be performed by any suitable means capable of performing the corresponding functions. The means may include various hardware and/or software component(s) and/or module(s), including, but not limited to, a circuit, an application-specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application-specific integrated circuit (ASIC), a field-programmable gate array signal (FPGA) or other programmable logic device (PLD), discrete gate or transistor logic, discrete hardware components, or any combination thereof designed to perform the functions described herein. The processor may be a microprocessor, but in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media may include random access memory (RAM), read-only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM, flash memory, ROM, programmable read-only memory (PROM), EPROM, EEPROM, registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application-specific integrated circuit (ASIC) with the processor, the bus interface, the user interface, supporting circuitry, and at least a portion of the machine-readable media integrated into a single chip, or with one or more field-programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc; where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for image reconstruction and domain transfer through an invertible depth network, comprising:
    training a first invertible depth network model using a first image dataset corresponding to a first geographic region to estimate a first depth map;
    retraining the first invertible depth network model using a second image dataset corresponding to a second geographic region to estimate a second depth map;
    reconstructing, by the first invertible depth network model, a third image dataset based on the second depth map; and
    training a second invertible depth network model using the third image dataset based on the second depth map to estimate a third depth map.

2. The method of claim 1, in which the first geographic region is different than the second geographic region.

3. The method of claim 2, in which the first geographic region comprises a first city within a first state of a first country, and the second geographic region comprises a second city within a second state of a second country.

4. The method of claim 1, in which the first image dataset and/or the second image dataset comprises a synthetic dataset.

5. The method of claim 1, in which reconstructing the third image dataset comprises traversing a backward path of the first invertible depth network model.

6. The method of claim 5, in which retraining comprising traversing a forward path of the first invertible depth network model to estimate the second depth map opposite the backward path of the first invertible depth network model.

7. The method of claim 1, further comprising estimating a trajectory of an ego vehicle based on the third depth map.

8. The method of claim 7, further comprising planning a trajectory of the ego vehicle according to the estimated trajectory of the ego vehicle.

9. A non-transitory computer-readable medium having program code recorded thereon for image reconstruction and domain transfer through an invertible depth network, the program code being executed by a processor and comprising:
    program code to train a first invertible depth network model using a first image dataset corresponding to a first geographic region to estimate a first depth map;
    program code to retrain the first invertible depth network model using a second image dataset corresponding to a second geographic region to estimate a second depth map;
    program code to reconstruct, by the first invertible depth network model, a third image dataset based on the second depth map; and
    program code to train a second invertible depth network model using the third image dataset based on the second depth map to estimate a third depth map.

10. The non-transitory computer-readable medium of claim 9, in which the first geographic region is different than the second geographic region.

11. The non-transitory computer-readable medium of claim 10, in which the first geographic region comprises a first city within a first state of a first country, and the second geographic region comprises a second city within a second state of a second country.

12. The non-transitory computer-readable medium of claim 9, in which the first image dataset and/or the second image dataset comprises a synthetic dataset.

13. The non-transitory computer-readable medium of claim 9, in which the program code to reconstruct the third image dataset comprises program code to traverse a backward path of the first invertible depth network model.

14. The non-transitory computer-readable medium of claim 13, in which the program code to retrain comprises program code to traverse a forward path of the first invertible depth network model to estimate the second depth map opposite the backward path of the first invertible depth network model.

15. The non-transitory computer-readable medium of claim 9, further comprising program code to estimate a trajectory of an ego vehicle based on the third depth map.

16. The non-transitory computer-readable medium of claim 15, further comprising the program code to plan a trajectory of the ego vehicle according to the estimated trajectory of the ego vehicle.

17. A system for image reconstruction and domain transfer through an invertible depth network, the system comprising:
    a depth map estimation module to train a first invertible depth network model using a first image dataset corresponding to a first geographic region to estimate a first depth map, and to retrain the first invertible depth network model using a second image dataset corresponding to a second geographic region to estimate a second depth map;
    an image reconstruction module to reconstruct, using the first invertible depth network model, a third image dataset based on the second depth map; and
    a domain transfer module to train a second invertible depth network model using the third image dataset based on the second depth map to estimate a third depth map.

18. The system of claim 17, in which the first geographic region comprises a first city within a first state of a first country, and the second geographic region comprises a second city within a second state of a second country.

19. The system of claim 17, in which to reconstruct the third image dataset the image reconstruction module is configured to traverse a backward path of the first invertible depth network model.

20. The system of claim 17, further comprising an ego perception module to estimate a trajectory of an ego vehicle based on the third depth map.

* * * * *